Sept. 30, 1969 P. G. DEMBLING 3,470,496
GENERAL COUNSEL OF THE NATIONAL AERONAUTICS
AND SPACE ADMINISTRATION
STATIC INVERTER
Filed April 19, 1967 2 Sheets-Sheet 1
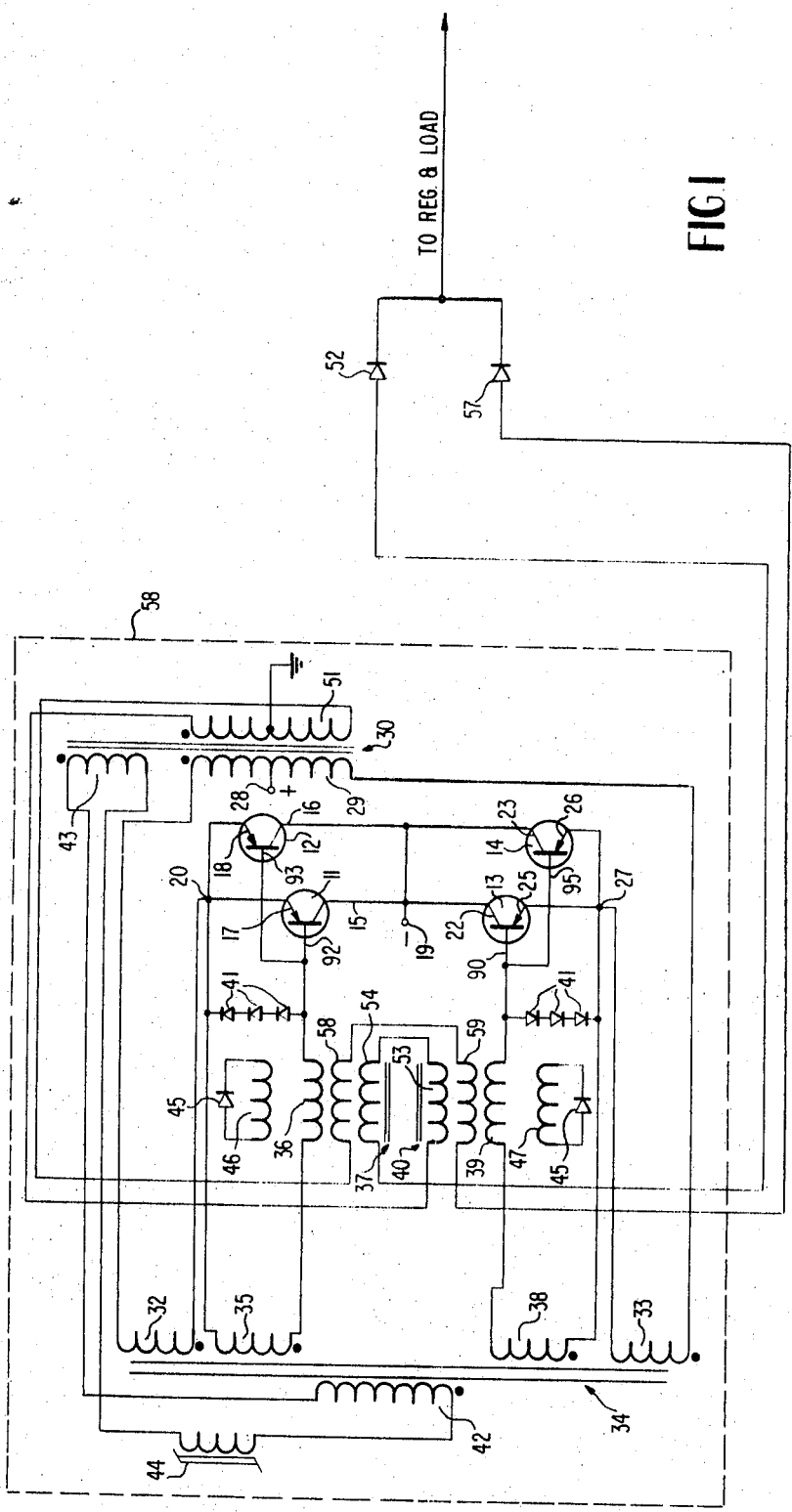
INVENTOR
JOHN T. LINGLE
ATTORNEYS

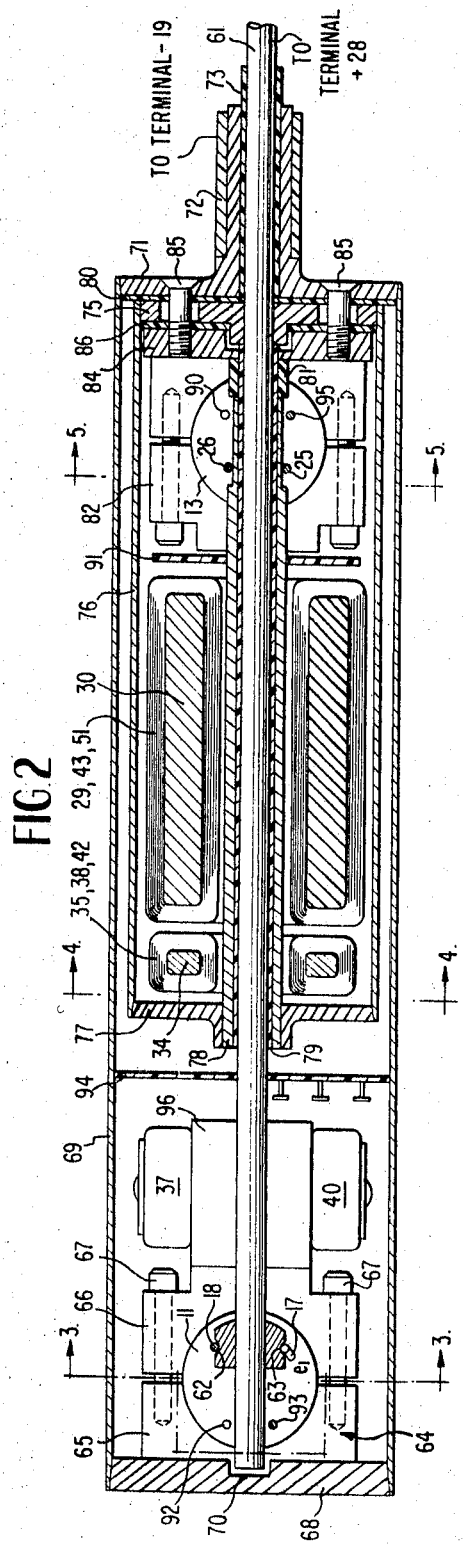
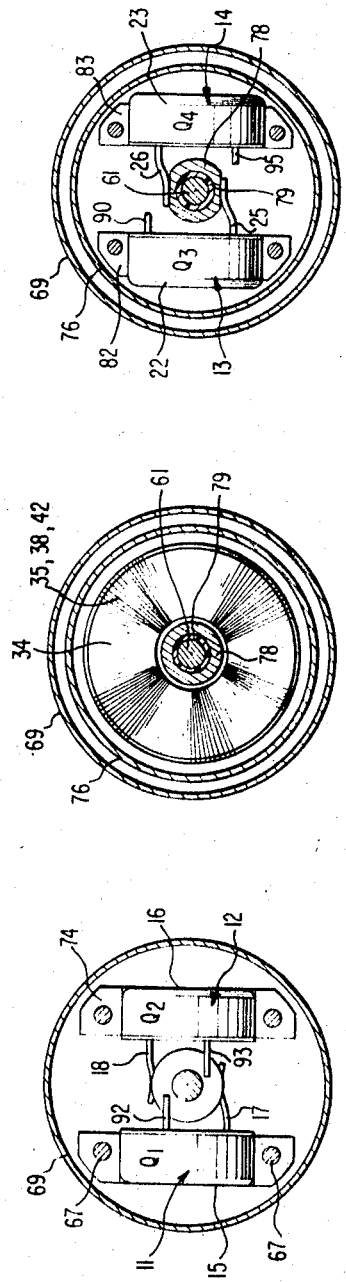

3,470,496
STATIC INVERTER
Paul G. Dembling, General Counsel of the National Aeronautics and Space Administration, with respect to an invention of John T. Lingle, Bloomington, Minn.
Filed Apr. 19, 1967, Ser. No. 632,104
Int. Cl. H03k 3/28, 3/30
U.S. Cl. 331—113                        17 Claims

ABSTRACT OF THE DISCLOSURE

An oscillating static inverter packaged to minimize external magnetic fields comprises transistors positioned at opposite ends of an outer conducting tube coaxial with a center conductor. The tube and conductor supply current from a D.C. supply at one end of the tube to the transistors at the other end of the tube during one-half cycle of oscillation. A second outer tube and center conductor feed current in opposite directions to the transistors at the first end of the tube during the other half cycle. The two center conductors are center tapped windings of coupling and power transformers of the oscillator.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The present invention relates generally to static inverters and more particularly to a transistorized static inverter arranged in a coaxial manner, whereby substantially zero external magnetic fields are derived.

Transistorized static inverters are frequently employed for converting large amounts of power from low voltage sources to high voltage A.C. that is rectified for driving electronic circuits. For many high power applications, current flowing from the low voltage D.C. source to the static inverter is on the order of 85 amperes, a magnitude sufficient to produce a substantial magnetic field in the vicinity of the inverter. For many applications, such as magnetometers, the substantial magnetic fields derived from an 85-ampere D.C. source are intolerable. Considering the specific instance of a magnetometer for measuring magnetic fields on the order of ten gammas, the magnetic field from a D.C. 85-ampere source virtually overpowers the magnetometer and reduces its sensitivity to external fields to zero.

According to the present invention, the magnetic field external to a static inverter driven by a low voltage, high power source is reduced substantially to zero by packaging the circuitry in a concentric coaxial arrangement. The circuitry comprises a pair of transistor elements connected in a push-pull oscillator circuit by a transformer, whereby one of the transistors is cut off while the other is driven substantially to saturation. The transistors and transformer are positioned in a container including a central, elongated conductor and an outer sleeve conductor, coaxial with the center conductor.

The second transistor is connected to the D.C. power source by a second elongated conductor concentric with and in proximity to, but insulated from, the center conductor. The emitter collector path of the second transistor is connected in a D.C. circuit to the power supply with a second outer conducting sleeve, coaxial with the center conductor and surrounded by the first-named sleeve. The conductors feeding current to the second transistor are connected to the D.C. power source so that current flowing in the second outer conductor is in a direction opposite from the current flow in the first outer conductor, while current in the second inner conductor is in a direction opposite from the current flow direction of the center inner conductor. Because all currents in the inner and outer conductors of the circuits driving the first and second transistors are in opposite directions during alternate half cycles of the two transistors, the magnetic field derived from the static inverter is substantially zero. The equal and opposite concentric currents flowing in the conductors feeding currents to the transistors tend to cancel the magnetic fields generated by each conductor during each half cycle of the static inverter oscillation cycle.

The construction of transformers utilized for coupling electrodes of the transistors together and for feeding power to a load augments the concentric connections to the transistors in minimizing the magnetic field external to the inverter. The two inner conductors form center tapped primaries for these transformers since current flows through the conductors in opposite directions during alternate oscillation half cycles. The transformer secondaries are windings wound on gapless toroidal cores concentric with and in a magnetic flux path with the center conductors. The toroidal cores are positioned adjacent each other to minimize the magnetic dipole between them. The major portion of the transformer windings extends parallel to the inner conductors so that equal currents flow through them in opposite directions along the longitudinal axis of the inverter during each oscillation half cycle. Minimizing the magnetic dipole between the cores and arranging the transformer windings as stated contribute appreciably in reducing the external magnetic field of the inverter.

A further feature of the present invention is that the substantial heat generated by the transistors is effectively dissipated by a heat transfer conduction path between each transistor and the surrounding environment. Heat transfer between the transistors and the surrounding environment is established by connecting the transistors to relatively massive heat transfer blocks, that also serve as electrical connectors for the power handling collector electrodes of the transistors. The transistors are mounted at opposite ends of a tubular, coaxial casing housing for the static inverter, whereby one of the transistor clamps is thermally coupled to the exterior environment via a substantial metal, heat conducting plate. The other transistor is thermally coupled to the exterior environment of the inverter housing via a plurality of metal disks having a plurality of relatively narrow dielectric, glass spacers interposed therein. The metal disks and spacers are arranged so heat conduction between the transistor and the external environment is maintained while electrically isolating the transistor collector electrode connected to the clamp from an end plate serving as an electrical conductor between the inner conductor connected to one terminal of the supply and the second outer conducting sleeve which is surrounded by the extreme outer sleeve.

A further feature of the invention relates to the virtually lossless circuits connecting the D.C. power supply with the transistors of the inverter oscillator. To this end, a high conduction path between the power supply and transistors is attained by fabricating the relatively small cross section two inner conductors from copper, while the larger cross-sectional conducting surfaces of the two outer conductors are aluminum. The use of aluminum is advantageous in many applications, such as space craft magnetometers, because of weight considerations.

Maximum conductivity between the D.C. source and transistors is also attained by tapering the two outer conductors at the area where they engage conducting end plates. The tapered mating surfaces of the end plates and outer conductors enable a greater area of contact to subsist between the plates and conductors, whereby a relatively low interface contact resistance occurs. In addition to maximizing the contact area between the plates and conductors, the tapered configuration forms a press fit joint to allow considerable tolerance in the diameter of the various circular components employed, thereby tending to diminish the effects of overall tolerance build-up and maintain concentricity.

It is, accordingly, an object of the present invention to provide a new and improved packaging construction for static inverters adapted to convert current from low voltage, high power sources to relatively high voltage A.C.

Another object of the present invention is to provide a system for converting power from a low voltage, high current D.C. source to relatively high voltage A.C., without substantially disturbing the magnetic field external to the package in which the converter is mounted.

Still another object of the present invention is to provide a new and improved static inverter employing a pair of push-pull connected transistors having D.C. current paths of equal magnitude and opposite directions through adjacent paths during alternate half cycle of the transistor conduction.

An additional object of the present invention is to provide a new and improved static inverter responsive to high power, low voltage D.C. sources without coupling substantial magnetic fields to an external environment, wherein the inverter has minimum weight and power dissipation losses due to resistive connections, and heat is efficiently transferred from active elements to an external environment.

Another object of the invention is to provide a new and improved coaxial transformer having a center tapped primary.

The above and still further objects, features and advantages of the present invention will become apparent upon consideration of the following detailed description of one specific embodiment thereof, especially when taken in conjunction with the accompanying drawings, wherein:

FIGURE 1 is a circuit diagram of a preferred static inverter of the present invention;

FIGURE 2 is a sectional view taken along the longitudinal axis of a package containing the static inverter of the present invention;

FIGURE 3 is a cross-sectional view taken through the lines 3—3, FIGURE 1, and specifically illustrating the position of a first pair of transistors;

FIGURE 4 is a cross-sectional view taken through the lines 4—4, FIGURE 1, specifically illustrating the end view of a transformer winding; and FIGURE 5 is a sectional view taken through the lines 5—5, FIGURE 1, illustrating a second pair of transistors.

Reference is now made to the circuit diagram of FIGURE 1, wherein two sets of parallel PNP transistors 11–14 are connected as a push-pull oscillator comprising the static inverter of the present invention. Transistors 11 and 12 are connected in parallel circuits, whereby the collectors 15 and 16 and emitters 17 and 18 are respectively connected to the negative D.C. voltage at terminal 19 and a floating D.C. potential at terminal 20. Similarly, collectors 22 and 23 of transistors 13 and 14, respectively, are connected to the negative D.C. voltage at terminal 19, and emitters 25 and 26 are connected to floating terminal 27. A D.C. path is established from the positive D.C. voltage at terminal 28 to floating terminals 20 and 27 via split primary winding 29 of transformer 30 and windings 32 and 33 of transformer 34. Thereby, a D.C. path is provided from the low voltage, high power D.C. source connected between terminals 19 and 28 and the emitter collector paths of transistors 11–14. Since substantial currents, as great as 85 amperes, may flow between terminals 19 and 28 during one-half cycle of an oscillation period, the emitter and collector electrodes of transistors 11–14 are referred to in the specification and claims as power electrodes.

Control for switching currents through the power electrodes of transistors 11–14 is accomplished by feeding regenerative feedback currents to the bases of the several transistors. The parallel bases 92 and 93 of transistors 11 and 12 are connected in a D.C. circuit with emitters 17 and 18 via windings 35 and 36 of transformers 34 and 37, respectively. A similar connection exists between the emitter and base electrodes of transistors 13 and 14 through windings 38 and 39 of transformers 34 and 40, respectively. Shunting the emitter base paths of transistors 11–14 are two separate diode protective circuits, comprising three series-connected diodes 41.

Windings 35 and 38 feed control voltages to the bases of transistors 11–14 in response to A.C. voltages of opposite polarity being induced therein by the currents fed to primary winding 42 of transformer 34. Winding 42 is A.C. coupled to primary winding 29 of power transformer 30 via winding 43, connected in a D.C. circuit with winding 42 via saturable reactor 44. Reactor 44 is designed to saturate at a predetermined flux level to control switching of transistors 11–14. Because of the direction windings 35 and 38 are wound, transistors 11 and 12 are activated to a substantially saturated condition while transistors 13 and 14 are driven to cut-off during one-half cycle of the oscillation operation, and vice versa for the other half-cycle of oscillation operation. In response to reactor 44 saturating at the end of each half-cycle, a negative feedback signal is momentarily coupled from winding 43 of power transformer 30 to winding 42 of transformer 34. The negative feedback current coupled between windings 43 and 42 overcomes the inherent positive feedback coupled by transformer 34 to the base electrodes of transistors 11–14 to recycle the circuit.

Transformers 37 and 40 are connected in the base circuits of the two parallel transistors to decouple the oscillator transistor being switched off from the windings on feedback transformer 34, whereby the transistor being switched can be back-biased to a higher voltage during switching. Decoupling is established by connecting diodes 45 across secondary windings 46 and 47 of transformers 37 and 40, respectively.

To derive significant power from the oscillator comprising transistors 11–14, power output transformer 30 is provided. Transformer 30 includes a grounded center tap secondary winding 51, having one end connected to power rectifying diode 52 via windings 53 and 54 of transformers 40 and 37, respectively. The other end of secondary winding 51 is connected to power rectifier 57 via the D.C. path through windings 58, 59 of transformers 37 and 40, respectively. Current flowing through either side of center tapped winding 29 flows through one of windings 32 or 33 of current feedback transformer 34 to the emitters of transistors 11 and 13, respectively. This current excites transformer 34 and forward biases the conducting transistor and reverse biases the non-conducting transistor through one of windings 35 or 38 to establish a current feedback path to the base emitter junctions of transistors 11–14. The cutoff and conducting states of the transistors are maintained until the pulse coupled via saturable reactor 44 to winding 42 switches the transistors into their opposite conductivity state. Rectifiers 52 and 57 convert the relatively high voltage A.C. waveform derived across the opposite ends of winding 51 to a D.C. voltage having a magnitude governed by the turns ratio of windings 29 and 51. The full wave rectified voltage derived at the cathodes of diodes 52 and 57 is applied to a regulator, of conventional design, and a load.

The static inverter illustrated schematically within dotted lines 58 of FIGURE 1 is constructed and packaged in a manner illustrated by FIGURES 2–5, whereby the relatively large D.C. current flowing between terminals 19 and 28 produces virtually no magnetic field at a distance of approximately one foot from the container housing the inverter. Substantial cancellation of the magnetic field is achieved by placing transistors 11–14 and transformers 30 and 34 at positions wherein substantially all of the current supplied to the power electrodes of the transistors flow in opposite concentric paths during each oscillation half cycle and the flow directions in the concentric paths are substantially reversed for alternate half cycles. To these ends, transistors 11 and 12 are mounted at the left end of the unit illustrated by FIGURE 2, while transistors 13 and 14 are mounted at the right end of the unit. The emitter and collector power handling electrodes of transistors 11–14 are connected to terminals 19 and 28 of the low voltage, high power D.C. supply via D.C. connections whereby current is supplied to transistors 11 and 12 from connections at the right end of the unit illustrated in FIGURE 2 in a first direction, while current is supplied to transistors 13 and 14 from terminals 19 and 28 in a direction opposite to the current flow to transistors 11 and 12.

Connections between the collector and emitter electrodes of transistors 11 and 12 are established by providing copper, elongated center rod 61 that is directly connected in D.C. circuit to positive supply terminal 28. Rod 61 extends virtually the entire length of the unit illustrated in FIGURE 2 and carries aluminum bushing 62 at its left end. Bushing 62 includes a peripheral groove 63 to which emitter pins 17 and 18 of transistors 11 and 12, respectively, are connected by soldering. Bushing 62 is also soldered to rod 61, whereby a low resistivity connection subsists between terminal 28 and emitters 17 and 18.

The emitter collector path of transistors 11 and 12 is returned to negative terminal 19 of the D.C. supply via aluminum transistor clamp 64. Clamp 64 is divided into two separate sections 65 and 66, having threaded bores through which bolts 67 extend. Each of clamp sections 65 and 66 has a substantially semi-circular bore cut on its inner face, whereby the two clamp sections, when secured together by bolts 67, are firmly connected to the casing of transistor 11. Since the metal casing of transistor 11 functions as the power dissipating collector electrode thereof, secure electrical and mechanical contact is thereby established between collector electrode 15 of transistor 11 and clamp sections 65 and 66.

The D.C. path between clamp 64 and terminal 19 is continued by virtue of clamp section 65 being fixedly mounted by suitable means, not shown, on circular aluminum end plate 68. End plate 68 is insulated from the positive voltage at terminal 28, by virtue of shoulder 70 therein, whereby rod 61 does not contact metal end plate 68. The periphery of end plate 68 is tapered outwardly to provide a secure press fit with the similarly tapered inner periphery of outer aluminum tube 69, that runs the entire length of the unit illustrated in FIGURE 2.

The right inner surface of tube 69 is tapered similarly to the left inner periphery thereof to form a secure press fit with the outward taper of aluminum right end bell 71. Right end bell 71 carries copper sleeve 72 on its outer periphery, which sleeve is connected to the negative terminal 19 of the low voltage supply for the static inverter.

End bell 71 is insulated from center conductor 61 by dielectric sleeve 73, extending from the extreme left portion of the end bell to slightly beyond the right portion thereof.

It is thus seen that a D.C. path is established from positive terminal 28 through copper rod 61 to the emitter collector path of transistor 11, bracket 64, end plate 68, sleeve 69 and end bell 71 to sleeve 72, connected to terminal 19. A similar path exists between the emitter collector electrodes of transistor 12, except that the collector of transistor 12 is connected to bracket 74.

In addition to providing a low resistance path between terminals 19 and 28, the arrangement of conductor 61 with brackets 64 and 74 and end plate 68 enables the considerable heat dissipated in the collectors of transistors 11 and 12 to be conducted to the environment external of the inverter housing. Conduction of the heat dissipated in the collector electrodes 15 and 16 of transistors 11 and 12 is facilitated by the high conductance heat transfer path between metal brackets 64 and 74 to metal end plate 68 and the metal housings of transistors 11 and 12.

Consideration is now given to the D.C. conduction path between terminals 19 and 28 to the emitter collector electrodes of transistors 13 and 14, positioned at the right end of the static inverter unit illustrated in FIGURE 2. The path from positive electrode 28 of the D.C. power source is initially through center conductor 61 to aluminum plate 75, positioned in proximity to the left end of conducting end bell 71. The adjacent surfaces of end bell 71 and plate 75 are separated by thin, glass spacer disk 80, whereby electrical insulation is attained between the end bell and plate while providing a high conductance heat path between them. Current from conductor 61 flows through aluminum plate 75 to aluminum sleeve 76, coaxial with inner conductor 61 and having a radius slightly less than outer sleeve 69. D.C. current from terminal 28 flows through sleeve 76 to centrally apertured aluminum plate 77. The inner periphery of sleeve 76 is outwardly tapered at its left end to provide a press fit with a similar taper for the outer edge of plate 77, in a manner similar to the press fit between end plate 68 and sleeve 69.

The central bore of plate 77 is soldered to the outer periphery of copper tube 78, that is coaxial with inner conductor 61. Tube 78 and conductor 61 are electrically insulated from each other by insulating layer 79, carried on the outer periphery of conducting rod 61 for a substantial portion of its length. The D.C. path from terminal 19 continues along the longitudinal axis of tube 78 toward the right end of the unit, that is maintained in situ by dielectric annular spacer 81. The top and bottom right end surfaces of tube 78 are flattened to facilitate soldering emitter electrodes 25 and 26 of transistors 13 and 14 to the etxernal tube surface.

The path through the emitter collector electrodes of transistors 13 and 14 is continued back to negative terminal 19 of the D.C. power supply by connecting the housings of transistors 13 and 14, which serve as the collector electrodes thereof, to metal clamps 82 and 83, respectively. Clamps 82 and 83 are substantially identical to clamp 64, described in detail supra, and are fixedly mounted on annular, aluminum plate 84, secured in situ by six brass screws 85, only two of which are shown. The heads of brass screws 85 fit into tapered bores in right end bell 71 while the threads thereof engage threaded bores of annulus 84 to provide an electrical path between the collectors of transistors 13 and 14 via clamps 82 and 83, annular plate 84, end bell 71 and sleeve 72 to supply terminal 19. Annular plate 84 is electrically insulated from the positive voltage at terminal 28 by relatively thin glass spacer plate 86, between the adjacent surfaces of plates 84 and 75.

Electrical insulation between annular plate 84 and terminal 28 is also achieved with dielectric layer 79 on conducting rod 61 and an air gap between the central shoulder of plate 75 and the central shoulder of plate 84. No electrical path is established between plates 75 and 84 through the six brass screws 85 since plate 75 includes six bores having diameters substantially greater than the diameter of each screw. Thereby, an air gap subsists between the screws and metal plate 75 and the two plates are maintained electrically isolated from each other.

While plate 75 is electrically insulated from end bell 71 and plate 84, a high conduction thermal path exists between the several metal surfaces through relatively thin glass disks 76 and 86. Thereby, heat dissipated in the collectors of transistors 13 and 14 is conducted through brackets 82 and 83, plates 75 and 84 and disks 80 and 86 to end bell 71, where it can be radiated into the environment surrounding the inverter. The placement of transistors 13 and 14 in proximity to the right end of the inverter unit enables the heat dissipated in the transistors to be conducted to an exterior environment without substantial heat transfer to the remaining electrical components located in the center of the unit.

From the foregoing, it is believed obvious that during the half-cycle when transistors 11 and 12 are conducting to the exclusion of transistors 13 and 14, D.C. current flows centrally of the unit illustrated in FIGURE 2 from the right to the left ends. Current returning to the D.C. power supply after being coupled through transistors 11 and 12 returns to the right end of the unit on the exterior surface defined by tube 69 from left to right. In an opposite manner, when transistors 13 and 14 are conducting and transistors 11 and 12 are cut off, D.C. current flows through an external path from right to left through tube 76 and flows through a central portion of the unit from left to right through sleeve 78. Because the exterior and interior currents flow in opposite directions during each half cycle of the oscillator operation, the magnetic field at a location less than one foot from the unit illustrated in FIGURE 2 is low enough to enable a magnetometer having a sensitivity to detect 10 gammas of magnetic field to operate without being affected by the operation of the static inverter of the present invention. Such a magnetometer is not affected by the static inverter of the present invention even though the D.C. power source connected between terminals 19 and 28 feeds a current of 83 amperes to the unit for conversion to alternating current.

The external magnetic field derived from the unit illustrated in FIGURE 2 is also minimized by the placement and electrical connections to radially extending plates 68, 77, 84 and end bell 71. These radially extending units are positioned and connected so that the radial current flow in each either converges on the centrally located conductors or radiates from them, whereby for every radial current vector in one direction there is an equal current vector in the opposite direction to produce canceling magnetic fields at a distance on the order of one foot from the unit. This is seen by considering that current flows outwardly from the center of plate 68 and inwardly to the center of end bell 71 while transistors 11 and 12 are conducting, while current flows inwardly to the center of plate 77 and outwardly from the center of plate 84 while transistors 13 and 14 are conducting. Because each pair of radially conducting surfaces has approximately equal area, the current density through each is the same and the magnetic fields are effectively canceled at a relatively short distance from the unit illustrated.

The physical construction and placement of transformers 30 and 34 also enable the magnetic disturbance external to the unit illustrated to be minimized, despite the severe currents flowing. To this end, the cores of transformers 30 and 34 are fabricated from a high permeability material, having very low coercive force and very low residual flux. Typical of the materials utilized for the cores of transformers 30 and 34 are magnetic materials having narrow, non-square loops, such as mumetal, supermalloy and permalloy. The cores of transformers 30 and 34 are formed as metal strips concentrically wound about each other along an axis coincident with the longitudinal axis of center conductor 61. The core of transformer 34 comprises a single such strip, formed as a single toroid, while the core of transformer 30 comprises a plurality of such toroids, stacked together to form a single core configuration. No gaps exist in the toroidal cores of transformers 30 and 34 to minimize the length of the magnetic flux path, thereby to minimize the magnetic flux external to the core.

Transformers 30 and 34 are mounted in proximity to each other and concentric with inner conductor 61 within the region defined by the inner surface of sleeve 76, the right-hand edge of plate 77 and dielectric disk 91. Dielectric disk 91 is fixedly mounted on tube 78 at the left end of clamps 82 and 83 to prevent translation of transformer 30 along the length of tube 78. Transformers 30 and 34 are positioned in close proximity to each other to reduce the magnetic flux dipole which is caused by residual flux between the magnetic poles established by the two transformers. Reducing the magnetic dipole between transformers 30 and 34 minimizes the external field derived from the two transformers.

Wound about the cores of transformers 30 and 34 are a plurality of windings, as indicated supra in conjunction with FIGURE 1. In particular, windings 29, 43 and 51 are wound about the core of transformer 30 while windings 35, 38 and 42 are wound about the core of transformer 34. The windings on the cores of transformers 30 and 34 are arranged so that they extend longitudinally of the cores, that is, parallel to the axis of center conductor 61. The only radial direction of the windings of transformers 30 and 34 is between the inner and outer surfaces of the transformer cores along the edges thereof, as illustrated in FIGURE 4. By positioning the windings of transformers 30 and 34 so they extend longitudinally along the length of center conductor 61, the magnetic field distribution of the windings is substantially cancelled. Cancellation occurs because current flowing in a winding on the outer surface of the core of transformer 30 flows from left to right while the same current component flows from right to left along the inner surface of the transformer core. Thereby, substantially the same cancellation effect is achieved as is obtained with concentric conductors 61, 78, 76 and 69.

The windings on the cores of transformers 30 and 34 serve only as the secondary windings for the transformers. The primary windings of transformers 30 and 34 are the centrally located conductors 61 and 78, whereby the primaries are merely linear conductors. The primary windings of transformers 30 and 34 can be considered as center tapped, however, because current flows through conductor 61 from right to left while current flows through tube 78 from left to right. Hence, center conductor 61 can be considered as the upper half of split primary winding 29 and winding 32 of transformer 34 while tube 78 is considered as the lower half of primary winding 29 and winding 33 of transformer 34.

Windings 35 and 38 of transformer 34 are connected via a shielded coaxial conductor, not shown, to the base electrodes of transistors 11–14. Terminals 92 and 93 of the base electrodes of transistors 11 and 12 are connected together by an insulated conductor, not shown, that is fed to one of the terminals on terminal board 94, fixedly mounted on center conductor 61 between plate 77 and clamps 64 and 74. Terminal pins 92 and 93 extend from the bottom of transistors 11 and 12 at such a position that they are spaced from center conductor 61 and bushing 62. Thereby insulation is maintained between the transistor base electrodes and the remaining components in the circuit, except the circuitry connected to winding 35, which is fed to the same terminal on board 94 as is connected to base pins 92 and 93. In a similar manner, base pins 90 and 95 of transistors 13 and 14, respectively, are connected via a shielded coaxial conductor to one of the terminals on board 94, which terminal is also connected to winding 38 of transformer 34 via another coaxial conductor. Also mounted on board 94 are diodes 41, shunting the emitter base junctions of transistors 11–14. The components mounted on board 94 are placed in locations to minimize the magnetic disturbance that might be derived therefrom.

Positioned between mounting board 94 and clamps 64 and 74 is transformer mounting block 96, for carrying transformers 37 and 40. Transformers 37 and 40 are mounted in relatively close proximity to each other, on opposite sides of mounting block 96 for the same reason that transformers 30 and 34 are positioned in adjacent relationship. Leads from transformers 37 and 40 extend to terminals on terminal board 94 and are shielded and positioned to minimize external magnetic field.

While there has been described and illustrated one specific embodiment of the invention, it will be clear that variations of the details of construction which are specifically illustrated and described may be made without departing from the true spirit and scope of the invention.

What is claimed is:

1. A static inverter for converting current from a low voltage D.C. source to A.C. without substantially disturbing the environmental magnetic field comprising a pair of transistors, means connecting the emitter collector electrodes of said transistors in D.C. circuit with opposite polarity terminals of said source, means connecting said transistors as a push-pull oscillator wherein only one of said transistors is conducting at a time, said D.C. circuit comprising: elongated center conductor means connecting the emitter collector paths of said transistor with one of said terminals, outer conductor means coaxial with said center conductor means connecting the emitter collector paths of said transistors, and means connecting said transistors with said conductor means for coupling current from said source through said outer conductor means in opposite directions during alternate oscillator half cycles and for coupling current from said source through said inner conductor means in opposite directions during alternate oscillator half cycles, said connecting means coupling current in opposite directions to said inner and outer conductor means during each oscillation half cycle.

2. The inverter of claim 1 wherein said push-pull oscillator connecting means includes a coupling transformer coupled to base electrodes of said transistors, said coupling transformer including a toroidal winding surrounding and in a flux path with said inner conductor means, whereby said inner conductor means and said winding are flux linked windings of said coupling transformer.

3. The inverter of claim 1 wherein said oscillator includes a power output transformer, the primary of said output transformer being said inner conductor means, the secondary of said output transformer comprising a toroidal winding surrounding and in a flux path with said inner conductor means.

4. The inverter of claim 3 wherein said push-pull oscillator connecting means includes a coupling transformer coupled to base electrodes of said transistors, said coupling transformer including a second toroidal winding surrounding and in a flux path with said inner conductor means, whereby said inner conductor means and said second winding are flux linked windings of said coupling transformer, each said windings being mounted on separate cores surrounding said inner conductor means, said cores being positioned proximate each other.

5. The inverter of claim 2 wherein said outer conductor means surrounds said winding.

6. The inverter of claim 1 further including means for directing currents radially in opposite directions from said source at opposite ends of said outer conductor means during each one-half oscillation cycle.

7. The inverter of claim 6 further including means for reversing the radial current flow direction at each end of said outer conductor means during alternate half cycles of oscillation.

8. The inverter of claim 7 wherein said inner conductor means comprises a metal rod and a metal sleeve surrounding and insulated from said rod, said outer conductor means comprises a first metal tube surrounding and insulated from a second metal tube, means connecting said source to said rod and first tube at one end of said first tube, means mounting said transistors proximate opposite ends of said first tube, said transformers being positioned between said transistors, the emitter collector path of the transistor proximate the first tube end remote from the connection to said source being connected to said rod and first tube, the emitter collector path of the other transistor being connected to said sleeve and second tube, said sleeve and second tube extending to between said transformers and the transistor proximate the first tube end remote from the connection to said source.

9. The inverter of claim 8 wherein the collector electrodes of said transistors comprise metal housings for said transistors, metal clamps for said transistor housing, and means providing heat conducting path from said clamps to the exterior of the inverter.

10. The inverter of claim 9 wherein the heat conducting path for the transistor proximate the first tube consists of one of said metal clamps and a metal end plate electrically and mechanically secured to said one metal clamp, the heat conducting path for the transistor proximate the other tube end comprises a metal plate electrically and mechanically separated from the clamp for the transistor proximate the other end of the tube and the means for reversing current flow at the other end of the tube by glass plates.

11. The inverter of claim 10 wherein said clamp and means for reversing current flow at the other end of the tube are electrically connected together in a D.C. circuit by metal securing means extending through and insulated from said metal plate.

12. The inverter of claim 11 wherein said two inner conductors are copper and said two outer conductors are aluminum.

13. The inverter of claim 12 wherein said means for reversing are circular plates having tapered peripheries having a force fit with the inner surfaces of said outer conductors.

14. The inverter of claim 8 wherein said transformers include windings extending in directions parallel to the axes of said conductors, said windings being positioned so that equal and oppositely directed currents flow therein along the conductor axes during each oscillation half cycle.

15. A transformer comprising:
a first elongated conductor centrally located having a first and second end;
a second elongated sleeve conductor axially aligned with said first elongated conductor but radially disposed and insulated therefrom and having a first and second end, said first end of said first conductor being radially adjacent to said first end of said second conductor, and said second end of said first conductor being radially adjacent to said second end of said second conductor;
a first terminal, said first end of said first conductor and said second end of said second conductor being in circuit with said first terminal;
a second terminal, said second end of said first conductor and said first end of said second conductor being in circuit with said second terminal, said first and second terminal provided with means for receiving a source of D.C. potential;
a winding surrounding said first and second conductor, said winding being in magnetic flux exchange relationship with said first and said second conductor.

16. The transformer of claim 15 wherein said winding extends longitudinally in the same direction as the longitudinal axis of said conductor.

17. The transformer of claim 15 wherein said winding is magnetically coupled with said conductor and sleeve by a toroidal core, said winding being wound on said core.

References Cited

UNITED STATES PATENTS

| | | | |
|---|---|---|---|
| 1,986,884 | 1/1935 | Fassler | 336—82 |
| 2,901,714 | 8/1959 | Baker | 336—82 |
| 3,287,679 | 11/1966 | Jensen et al. | 336—174 |
| 3,323,075 | 5/1967 | Lingle | 331—113.1 |

FOREIGN PATENTS

| | | |
|---|---|---|
| 719,219 | 12/1954 | Great Britain. |
| 1,361,953 | 4/1964 | France. |

JOHN F. COUCH, Primary Examiner

W. H. BEHA, Jr., Assistant Examiner

U.S. Cl. X.R.

321—2; 331—67; 336—82, 174, 195